P. HANNAGAN.
SNOW PLOW.
APPLICATION FILED APR. 25, 1910.
963,369.
Patented July 5, 1910.
5 SHEETS—SHEET 1.
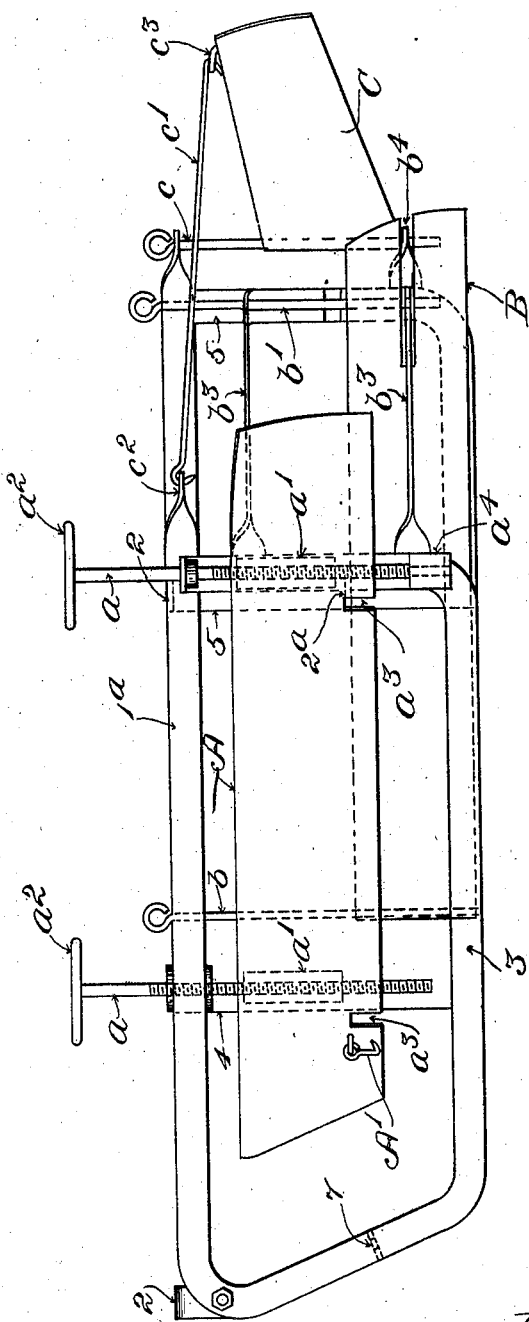
Witnesses:
Oscar F. Hill
Edith A. Wiseman
Inventor:
Paul Hannagan
by Chas. F. Randall
Attorney.

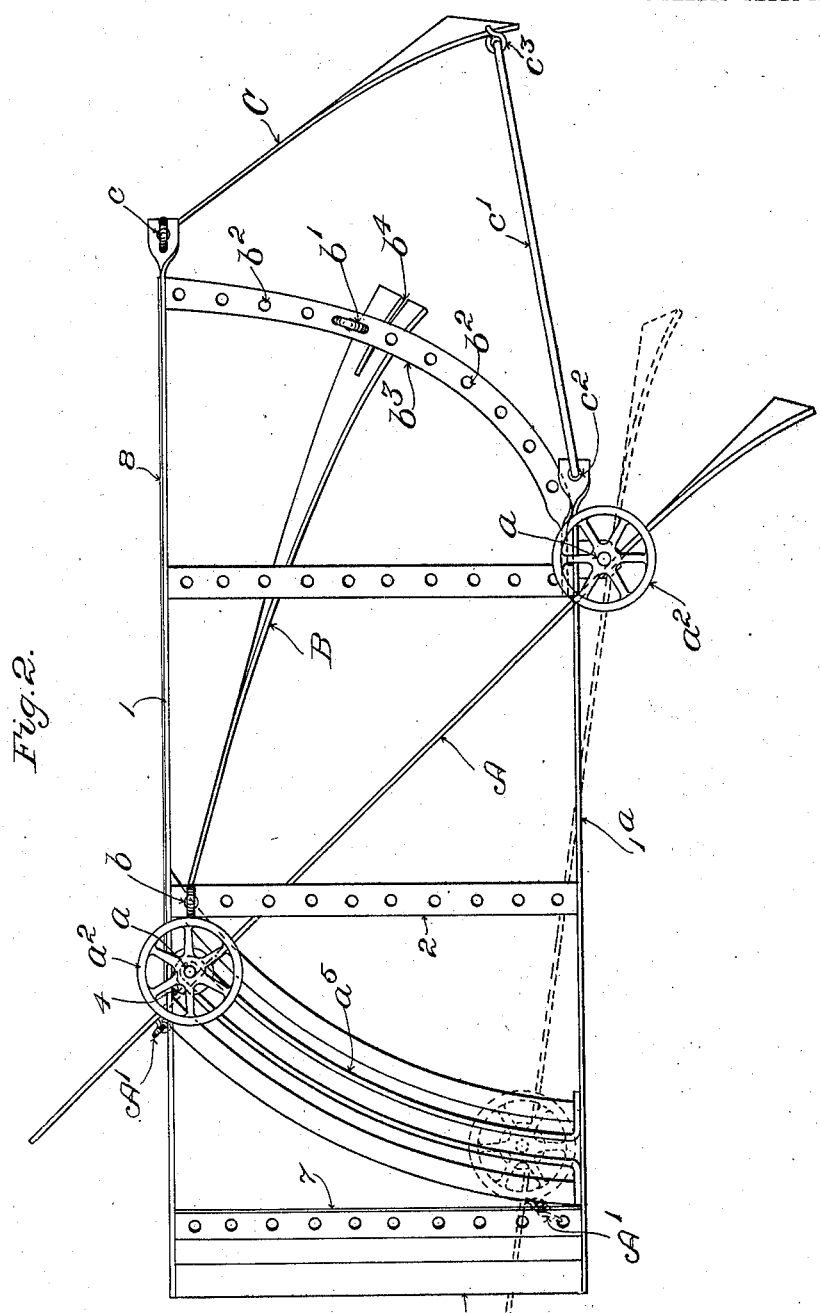

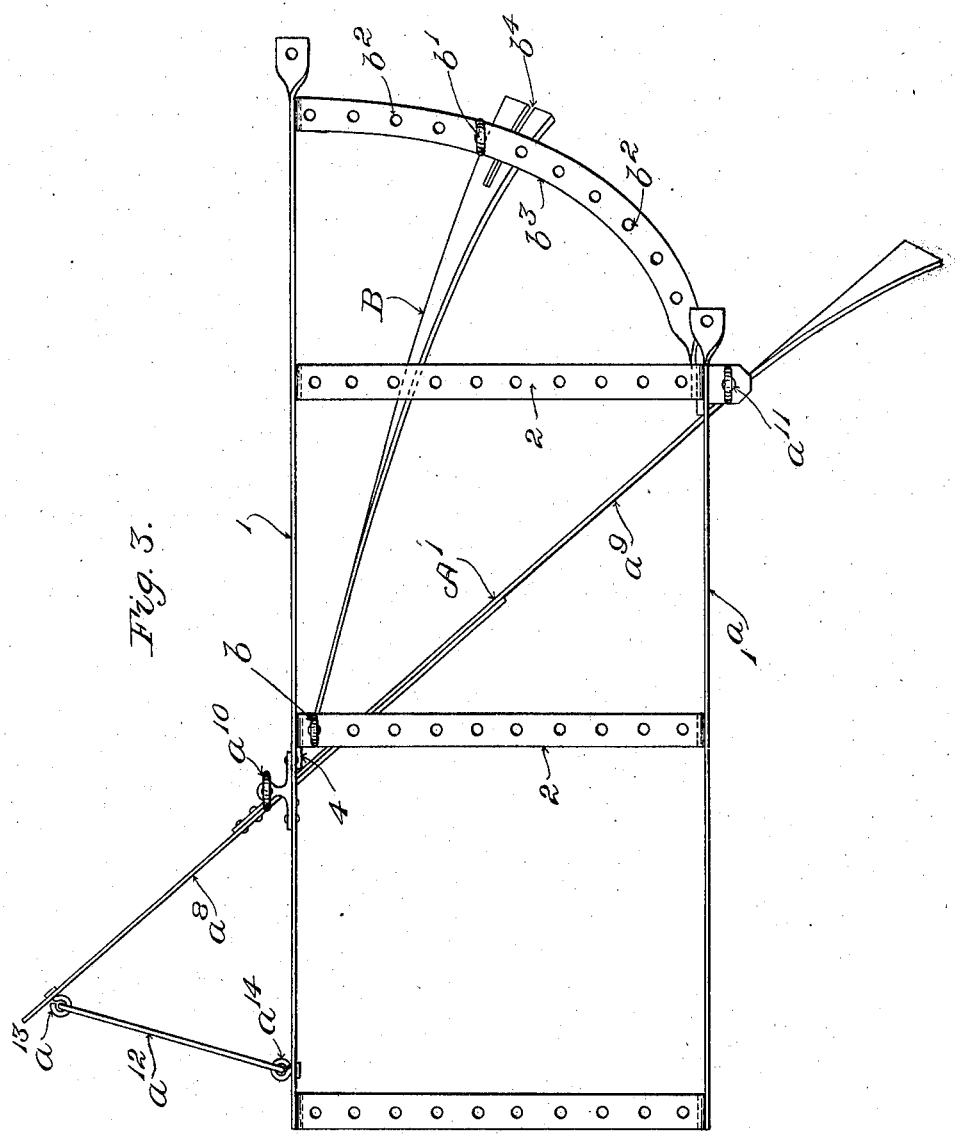

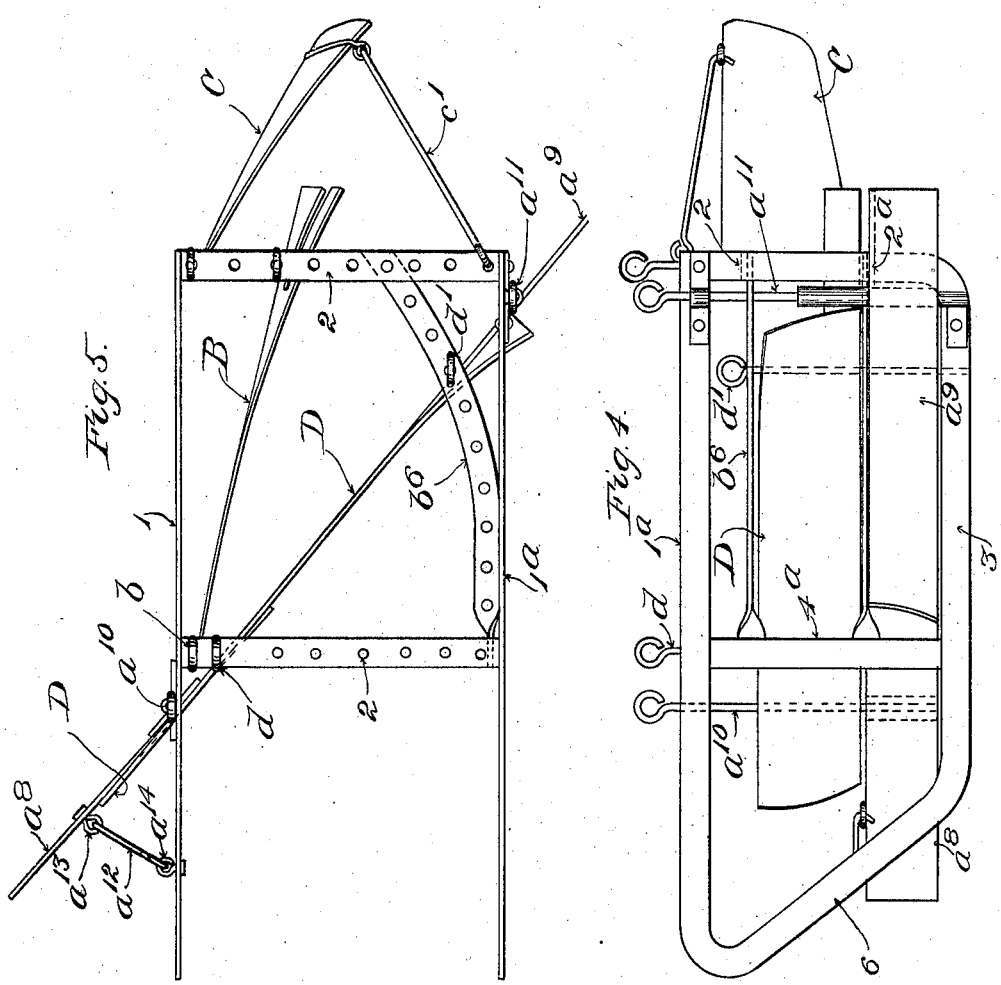

P. HANNAGAN.
SNOW PLOW.
APPLICATION FILED APR. 25, 1910.

963,369.

Patented July 5, 1910.
5 SHEETS—SHEET 5.

Witnesses:
Oscar F. Hill
Edith A. Wiseman

Inventor:
Paul Hannagan
by Chas. F. Randall
Attorney.

UNITED STATES PATENT OFFICE.

PAUL HANNAGAN, OF LAWRENCE, MASSACHUSETTS.

SNOW-PLOW.

963,369.  Specification of Letters Patent.  Patented July 5, 1910.

Application filed April 25, 1910. Serial No. 557,327.

*To all whom it may concern:*

Be it known that I, PAUL HANNAGAN, a citizen of the United States, residing at Lawrence, in the county of Essex, State of Massachusetts, have invented a certain new and useful Improvement in Snow-Plows, of which the following is a specification, reference being had therein to the accompanying drawings.

The invention comprises various improvements in snow plows for use in removing snow from side-walks, gutters, and roadways, or in spreading and leveling it over roadways.

Figure 7:
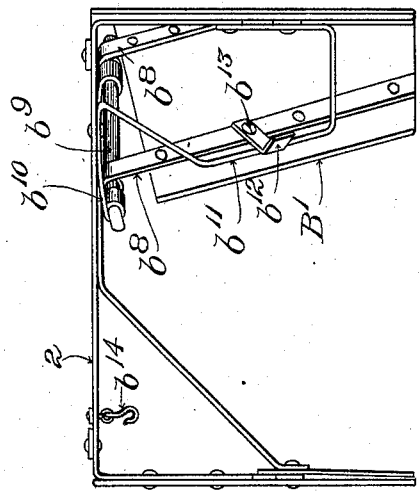
Figure 6:
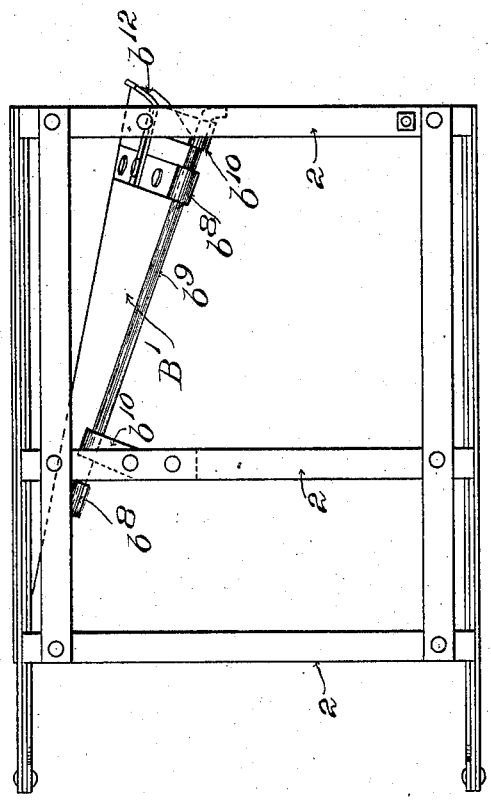

In the drawings,—Figure 1 shows in side-elevation a snow-plow embodying certain of the present improvements. Fig. 2 is a plan thereof. Fig. 3 is a plan of a snow-plow of modified construction. Fig. 4 is a side elevation of a plow of further modified construction. Fig. 5 is a plan thereof. Fig. 6 is a plan of a plow having a mold-board arranged to swing vertically. Fig. 7 is a rear elevation thereof.

The frame of each of the plows herein shown and described resembles in character that of the plow of United States Letters Patent No. 855,886, granted to me under date of June 4, 1907. In the case of the plow shown in Figs. 1 and 2, the frame comprises the opposite side-bars 1, 1ª, upper cross-bars 2, 2, extending from one side-bar to the other, runners 3, one or more side stanchions 4 extending down from a side-bar to a runner, a lower cross-bar 2ª, rear stanchions 5, 5, extending down from the rear ends of the side-bars to the rear ends of the runners, front stanchions 6 constituting cutters and inclining downward and rearward from the front ends of the side-bars to the front ends of the runners, and a cross-bar 7 extending from one cutter to the other. The specific construction may vary. At the side of the frame at which the snow discharges from the mold-boards the space between the side-bar and the runner is open so as to permit free lateral escape of the snow as it is crowded sidewise and slides along the mold-boards. At the opposite side of the frame the space at the rear of the side stanchion 4 is closed by a sheet 8, preferably of iron or steel. Sidewise displacement of the plow in consequence of the resistance offered to the transversely inclined mold-boards by snow packed in front of the latter is opposed by the snow alongside the outer surface of the said side-sheet 8, so that lateral divergence of the plow is avoided and the plow enabled to travel along in a straight path. The said plow of Figs. 1 and 2, and the other plows herein shown, are intended to be drawn by horses hitched thereto, as in the case of the plow of the Letters Patent aforesaid, but the propelling power may be varied.

The plow of Figs. 1 and 2 is provided with mold-boards or scrapers A and B, and a mold-board or leveler C. The mold-board or scraper A, when in its working position, extends obliquely across the frame of the plow at the rear of the cutters 6. It is of a length sufficient to cause its extremities to project through openings of the opposite side-frames of the plow, and some distance outward beyond the said side-frames at both sides of the plow. It is mounted in advance of the others, and will remove the snow from a path of a width beginning at a point some distance outward from the side-bar 1 and corresponding runner, and extending transversely to a point at some distance outward from the side-bar 1ª and corresponding runner, the snow being discharged at the latter side. The shorter mold-board or scraper B, at the rear of mold-board or scraper A, when in its working position extends obliquely across the plow in the same general direction as mold-board or scraper A, and it discharges the snow toward the same side of the plow as the latter. The third mold-board, or leveler, C, is hung or pivoted by one end thereof at the point $c$ to the frame of the plow at the same side of the latter as that on which the mold-board or scraper B, is hung or pivoted. Its purpose is to level off the ridge of snow produced by the action of the second mold-board or scraper B, reducing such ridge in height.

Mold-board or scraper A, when in its working position rests at its rear side against and is backed up by a side standard 4 near the front end of the plow, at one side of the latter, and the rear side standard 4 at the other side of the plow. It is vertically adjustable, to enable the height of the lower edge thereof to be varied. To this end it is mounted upon screw-threaded rods $a$, $a$, standing vertically, the said mold-board or scraper being furnished with internally threaded blocks $a'$, $a'$, fitting upon the threaded portions of the rods $a$, $a$. By rotating the rods $a$, $a$, as by taking hold of the hand-wheels $a^2$, $a^2$, which are fixed upon the said rods, the mold-board or scraper A is raised or lowered as required. One of the screw-threaded rods $a$, $a$, is supported in bearings upon the plow-frame at the side of the plow-frame at which the rear end of mold-board or scraper A is located. The other is supported by a bearing $a^4$ which is mounted as presently will be described. Notches $a^3$, $a^3$, are formed in the lower edge of the mold-board or scraper A to receive the runners 3 and thereby enable the said mold-board or scraper to be lowered all the way down. When it is in its bottom position it will scrape clean the surface over which the plow is drawn. In a higher position it will scrape off the top portion of the snow to the extent desired, and it may be utilized for removing a top crust. It may be used in its higher position to decrease the depth of the snow so as to lessen the work devolving upon the second mold-board or scraper B in clearing a side-walk or gutter.

To avoid having to turn the plow out of its proper path in order to clear a tree or other obstruction standing in the way of the projecting leading end of the mold-board or scraper A, the bearing $a^4$ for the adjacent screw-threaded rod $a$ is mounted in a curved guide $a^5$, Fig. 2, extending across the top of the frame of the plow, the bearing being movable along this guideway so that the mold-board or scraper A may be swung around the other rod $a$ as a pivot from its transversely inclined or oblique position shown in Figs. 1 and 2 to an intermediate position in which its leading end is between the sides of the frame, or even to a position in which the entire length of the said mold-board or scraper is located close to the opposite side of the frame. This mode of mounting the said mold-board or scraper enables it, when elevated sufficiently by means of screw-threaded rods $a$, $a$, to clear the runners 3, to be swung inwardly toward the middle of the width of the plow clear of any obstruction, tree, or the like, without changing the course of the plow itself, and consequently without diverting the mold-board or scraper B from the required path upon the side-walk or in the gutter. The mold-board or scraper A may be secured in either of the positions last described, as desired, by means of a hook A′ engaging with a hole in the cross-bar 7, as shown by dotted lines in Fig. 1, or with the side-frame of which side-bar $1^a$ forms a part. The side of the plow-frame beyond which the leading end of the mold-board or scraper A projects being open or skeleton like as indicated in Fig. 1, at least in the fore-part of the plow, the leading end of the said mold-board or scraper is free to swing transversely in and out through the said side. The lateral extension of mold-board or scraper A enables the horses by which the plow is propelled to be kept out of deep snow that has been shoveled into a gutter, in case the plow is being used for leveling off the deep snow preliminary to cleaning out the gutter. This advantage grows out of the fact that such end reaches a considerable distance to one side of the horses' track.

Mold-board or scraper B is hung or pivoted at or near its front or leading end, at the point $b$, to the frame of the plow, at or near the side of such frame at which the leading end of mold-board or scraper A is located. For the purposes of the said pivotal connection the said end of the said mold-board or scraper B is in this instance engaged with an upright pin or rod $b$ occupying holes in the intermediate cross-bar 2 and in a lug (not shown) projecting from a suitable portion of the side-frame below said cross-bar.

To enable the width of the path cleared by the mold-board or scraper B to be varied as required, the said mold-board or scraper is mounted with capacity to be swung transversely more or less upon its pivot $b$. It is held in the desired position of adjustment by means of the pin $b'$, which is inserted in a vertical position into holes $b^2$, $b^2$, in upper and lower transversely extending braces $b^3$, $b^3$, extending across the frame from one side thereof to the other side thereof.

To prevent the free or swinging rear end of mold-board or scraper B from dragging, it is engaged with a horizontal strip or bar forming a part of the plow-frame. This strip or bar is in the case of Figs. 1 and 2 the lower cross-brace $b^3$, which extends from the rear-end stanchion at one side of the plow-frame to the rear end stanchion at the other side thereof. For engagement with the said strip or bar, the said end of the mold-board or scraper is slotted as at $b^4$, Fig. 1, to fit the same. Thereby the said end is supported in the different positions of the mold-board or scraper B.

When in its working position the mold-board or leveler C occupies a rearwardly inclined position shown in Figs. 1 and 2, in which it is retained by means of a link $c'$ having one end thereof engaged, as by means of a hook, with side-bar 11 of the frame, as by means of a hole or eye at $c^2$ in the rear end of such side-bar into which the said hook enters, the said link having the other end thereof similarly engaged, as by means of a hook and an eye $c^3$, with a convenient portion of the mold-board or leveler C. The forward end of link $c'$ might be engaged in one of the holes $b^2$ of upper cross-brace $b^3$. To enable the transverse obliquity or inclination of the mold-board or leveler C to be varied, the forward end of the link $c'$ may be shifted into any suitable one of the holes $b^2$ of the upper cross-brace $b^3$.

When it is desired to put the three mold-boards, or scrapers, and leveler out of operation at the time when the plow is being moved about from place to place, the mold-board A is swung as already referred to, from its position in Figs. 1 and 2 into a position close alongside the opposite side of the plow-frame, and held in such position by the hook A' engaged in a hole in side-bar $1^a$. The mold-board or scraper B is released by withdrawing the pin $b'$, and swung up close against the first side of the frame, and there secured by a pin introduced into holes of rear cross-bars or braces 2, $2^a$, or in braces or cross-bars $b^3$, $b^3$. The third mold-board or leveler C either may be removed by disengaging the link $c'$ and disconnecting the said mold-board or leveler from the pivotal pin $c$, or the link $c'$ may be disengaged and the mold-board or leveler C may be swung around and forward against either the outer side or the inner side of the side of the plow-frame to which it is pivotally connected, and be there secured snugly in place by suitable means.

In the case of the plow shown in Fig. 3 the first mold-board or scraper A' is made in two parts, respectively designated $a^8$ and $a^9$, the former of which is pivoted at $a^{10}$ and the latter at $a^{11}$, the pivots being located at the opposite sides of the plow-frame. When in its working position the portion $a^9$ of the said mold-board or scraper rests by its leading extremity against the front edge of the side-stanchion 4 adjacent the pin $a^{10}$ to which the portion $a^8$ is pivoted, and the inner extremity of the said portion $a^8$ normally occupies a position overlapping and in contact with the portion $a^9$. The outer extremity of the portion $a^8$ is engaged by the hooked outer end of a link $a^{12}$ which enters an eye-piece $a^{13}$ connected with the said outer end, the said link $a^{12}$ having at its inner extremity engagement with an eye-piece $a^{14}$ carried by the fore-part of the corresponding side of the plow-frame. When it is desired to render the two-part mold-board or scraper A' inoperative, the link $a^{12}$ is disconnected from the portion $a^8$ and the latter is swung upon its pivot $a^{10}$ so as to carry the outer part of the said portion around rearwardly against the outer surface of the corresponding side of the plow-frame, while the inner part of the said portion is swung forwardly around close up against the inner surface of the said side of the plow-frame. Also, the portion $a^9$ is swung upon its pivot $a^{11}$ so as to cause it to lie close alongside the other side of the plow-frame. The portions $a^8$, $a^9$, are held in convenient manner in the positions described. Mold-board or scraper B and its attendant features are substantially as in the case of the corresponding part and features of Figs. 1 and 2, and this mold-board or scraper may be caused to assume an inoperative position alongside one side-frame of the plow-frame, as already explained, by removing the holding-pin $b'$. The mold-board or leveler C of Figs. 1 and 2 is omitted from Fig. 3, but may be employed if desired. The construction shown in Fig. 3 is advantageous because the leading end of the said mold-board or scraper may be caused to project more than in Figs. 1 and 2.

When the plow is at work with mold-board or scraper B in use, the snow scraped up thereby is permitted freer escape at the discharging side of the plow, in Figs. 1, 2, 3, by the fact that the side-frame and runner are shorter at that side than at the other. By having the rear-stanchion at the discharging side set farther forward, it is out of the way of the rear end of mold-board or scraper B, permitting the said mold-board or scraper to be adjusted around farther than otherwise would be possible thus enabling a wide path to be cleared when the occasion demands.

The plow of Figs. 4 and 5 employs in addition to mold-board or scraper B, and mold-board or leveler C, a two part mold-board or scraper $a^8$, $a^9$, like that of Fig. 3, and above the same a second mold-board or scraper D which is pivoted near one end thereof upon the pin $d$ located close alongside the pivot-pin $b$ of the mold-board or scraper B, the opposite end of the mold-board D being held up to its work by a removable backing-pin $d'$ applied to upper and lower horizontal strips or braces $b^6$, $b^6$, at the corresponding side of the plow-frame. The said opposite end of portion $a^9$ rests upon and is supported by the lower one of the said strips or braces $b^6$ which constitute a track therefor. The two strips or braces $b^6$, $b^6$, are attached at their front ends to a side-stanchion $4^a$ and at their rear ends to the rearmost cross-braces, 2, $2^a$.

The lower two-part mold-board $a^8$, $a^9$, of Figs. 4 and 5 is alone needed for working after a light snow-storm. The upper front mold-board D comes into service when considerable snow has fallen. In operating to clear gutters into which considerable snow has been shoveled, causing the accumulation to be more than mold-board or scraper B can handle, the upper front mold-board D is used, the two-part front mold-board $a^8$, $a^9$, being thrown out of use by swinging its two sections into their inoperative or non-working positions. On occasion, the upper front mold-board D alone may be utilized in first going over the course, the mold-boards $a^8$, $a^9$, B, C, being put out of action, and in making a second run over such course the mold-boards B and C being brought into action. Mold-board D may be adjusted into different working positions by shifting pin $d'$ into different holes in the strips or braces $b^6, b^6$. Mold-board $a^8, a^9$, may be used at the intersection of streets in slushy weather, and it also may be used to clear the crossings after the use of mold-boards B and C. If it should be desired to place mold-board D in inoperative position, this may be effected by withdrawing the pin $d'$ and swinging such mold-board over toward the side where it is hung or pivoted.

Figs. 6 and 7 show a construction in which a mold-board or scraper corresponding substantially with the second mold-board or scraper B of the preceding figures, here lettered B', may be swung vertically from its working position in Figs. 6 and 7 into a position immediately below the cross-bars 2, 2, 2, at the top of the plow-frame. The mold-board or scraper B' is hung by means of straps $b^8, b^8$, from a supporting rod $b^9$ occupying a horizontal position immediately below the cross-bars, and held by supports $b^{10}$ which are attached to the said cross-bars. The rod $b^9$ occupies a transversely oblique position corresponding with the oblique position necessary to be occupied by mold-board or scraper B' when at work. When the mold-board or scraper occupies its working position, it is backed up by a backing piece $b^{11}$ which is connected with the plow-frame, and it is locked in such position by means of a swinging latch $b^{12}$ pivoted to one of the straps $b^8$ at $b^{13}$ and adapted to engage with the backing-piece $b^{11}$. When the latch $b^{12}$ is moved so as to disengage it from the backing-piece $b^{11}$, thereby releasing the said mold-board or scraper, the latter may be swung around the axis of the rod $b^9$ up against or near the cross-bars, where it may be suitably held, as by means of a hook, $b^{14}$.

In some instances the plow may be mounted upon wheels, instead of runners.

I claim as my invention:—

1. In a snow-plow, in combination, the plow-frame having sides with openings, and a mold-board or scraper having a working position obliquely across the said plow-frame with extremities thereof projecting through said openings and extending beyond the side-frames, and movable from said working position into inoperative position substantially parallel with the side-frames.

2. In a snow-plow, in combination, the plow-frame, a mold-board or scraper having a working position obliquely across the said plow-frame with extremities thereof projecting beyond the sides of the latter, and movable from said working position into inoperative position substantially parallel with the said sides, and means for adjusting the mold-board or scraper vertically.

3. In a snow-plow, in combination, the plow-frame having sides with openings, a mold-board or scraper having a working position obliquely across the said plow-frame with extremities thereof projecting through said openings and extending beyond the side-frames, and movable from said working position into inoperative position substantially parallel with the side-frames, and means for adjusting the mold-board or scraper transversely.

4. In a snow-plow, in combination, a plow-frame, a transversely-oblique mold-board or scraper, a second mold-board or scraper at the rear of the first following in the path thereof and adapted to clear away the lower portion of the snow, and means for adjusting the second mold-board or scraper to vary the width of the path cleared thereby.

5. In a snow-plow, in combination, a plow-frame having runners, a transversely-oblique mold-board or scraper having end-portions which project at both sides of the runners beyond the said runners to shift the snow from one of said sides across to the other thereof, a second mold-board or scraper located between the runners at the rear of the first so as to follow along the same path, and inclined in the same direction, and means for adjusting the second mold-board or scraper to vary the width of the path cleared thereby.

6. In a snow-plow, in combination, a plow-frame having runners, a transversely-oblique mold-board or scraper between such runners, and a transversely-oblique leveler intermediately located with reference to the said runners at the rear of said mold-board or scraper, with its working edge at a higher level than that of the said mold-board or scraper, said leveler acting to level the ridge of snow produced by the action of the mold-board or scraper.

7. In a snow-plow, in combination, a plow-frame having runners, and a transversely-oblique gutter-cleaning mold-board or scraper located entirely between such runners, and mounted to swing into a non-working position.

8. In a snow-plow, in combination, a plow-frame having runners, and a transversely-oblique mold-board or scraper hinged to said plow-frame to swing transversely, and a support for sustaining the swinging end of said mold-board or scraper vertically.

9. In a snow-plow, in combination, a plow-frame, a horizontal strip or bar, and a transversely-oblique mold-board or scraper hinged to swing transversely into different positions and supported at its swinging end by the said horizontal strip or bar.

10. In a snow-plow, in combination, a plow-frame, a horizontal strip or bar, a transversely-oblique mold-board or scraper hinged to swing transversely into different positions and supported at its swinging end by the said horizontal strip or bar, and means to retain the said mold-board or scraper in its different positions of adjustment.

11. In a snow-plow, in combination, a plow-frame, a horizontal cross-brace forming a part thereof and joining its opposite sides, a transversely-oblique mold-board or scraper connected at its leading end to the said plow-frame at or near one side of the latter and supported vertically at its rear end by said cross-brace.

12. In a snow-plow, in combination, a plow-frame, a horizontal cross-brace forming a part thereof and joining its opposite sides, said cross-brace having a longitudinal series of holes therein, a transversely-oblique mold-board or scraper hinged at its leading end to the said plow-frame and supported at its swinging end by the said cross-brace, and means engaging in the said holes to retain the mold-board or scraper in the desired position of adjustment.

13. In a snow-plow, in combination, a plow-frame, having one runner thereof shorter than the other, a cross-brace extending transversely in an oblique direction from the rear portion of the side-frame with which the short runner is connected to the rearward projection of the opposite side-frame, and an oblique mold-board or scraper between the runners having its rear end rearward of the rear end of the short runner.

14. In a snow-plow, in combination, a plow-frame having side-frames and runners of different lengths, a cross-brace extending obliquely from the rear of the short side-frame to the rearward extension of the long side-frame, and a mold-board or scraper hinged at or near its forward end in connection with the plow-frame at or near one side of the latter and supported at its rear end by the said cross-brace.

15. In a snow-plow, in combination, a plow-frame having side-frames and runners of different lengths, a cross-brace extending obliquely from the rear of the short side-frame to the rearward extension of the long side-frame, a mold-board or scraper hinged at or near its forward end in connection with the plow-frame at or near one side of the latter and supported at its rear end by the said cross-brace, and means engaging with said cross-brace to hold the said mold-board or scraper in the desired position of adjustment for operation.

16. In a snow-plow, in combination, a plow-frame, a mold-board or scraper extending obliquely across from one side toward the other, a leveler also extending obliquely across from the former side to the latter at the rear of said mold-board or scraper and having its working edge higher than that of the latter, and the link extending forward from the said leveler to the plow-frame.

17. In a snow-plow, in combination, a plow-frame, and an obliquely-disposed cross-brace having a longitudinal series of holes, a mold-board or scraper extending obliquely across from one side toward the other, a leveler also extending obliquely across from the former side to the latter at the rear of said mold-board or scraper and having its working edge higher than that of the latter, and the link extending forward from the said leveler to the cross-brace and capable of being engaged in different holes of the said series.

18. In a snow-plow, in combination, a plow-frame, a plurality of obliquely-arranged mold-boards following in the same path and working at different levels, the leading mold-board adapted to remove the upper portion of the snow and the following mold-board operating upon the lower portion of the snow along the said path.

19. In a snow-plow, in combination, a plow-frame having uprights or stanchions at the opposite sides thereof, and an obliquely-disposed mold-board or scraper extending across the plow-frame from one side thereof to the other and backed-up adjacent its opposite ends by the said uprights or stanchions to overcome the pressure of the snow against the front face of the said mold-board or scraper.

In testimony whereof I affix my signature in presence of two witnesses.

PAUL HANNAGAN.

Witnesses:
CHAS. F. RANDALL,
NATHAN B. DAY.